United States Patent

[11] 3,593,689

[72] Inventor Robert L. Van Huis
 Zeeland, Mich.
[22] Filed Dec. 23, 1968
[45] Patented July 20, 1971
[73] Assignee U.S. Industries, Inc.
 New York, N.Y.

[54] POULTRY CAGE WITH ADJUSTMENT APPARATUS
 20 Claims, 4 Drawing Figs.
[52] U.S. Cl. .................................................. 119/18,
 119/48, 119/63
[51] Int. Cl. .................................................... A01k 31/00,
 A01k 31/14, A01k 05/00
[50] Field of Search .......................................... 119/18, 17,
 48, 61, 63

[56] References Cited
 UNITED STATES PATENTS
1,854,311 4/1932 Pavelec et al. ................ 119/18 X

| 2,140,856 | 12/1938 | Sentz | 119/61 |
| 2,176,814 | 10/1939 | Hawkins | 119/48 |
| 2,328,209 | 8/1943 | Giguere | 119/18 X |
| 2,436,095 | 2/1948 | Brossia | 119/18 |
| 3,311,087 | 3/1967 | Graves | 119/18 |

Primary Examiner—Hugh R. Chamblee
Attorney—Price, Heneveld, Huizenga and Cooper

ABSTRACT: A poultry cage having a movably mounted member across its front which forms an upper sidewall part of a feeder trough disposed along the front of the cage, such that the member when raised decreases the effective depth of the trough and allows feeding through the lower part of the front wall, and when lowered increases the effective depth of the trough while allowing feeding through a higher part of the front wall. Also, the cage enclosure includes a floor which is vertically movable and adjustable between predetermined heights.

INVENTOR.
ROBERT L. VAN HUIS
BY
ATTORNEYS

POULTRY CAGE WITH ADJUSTMENT APPARATUS

BACKGROUND

Cage enclosures for confining poultry inside poultry houses have rapidly grown in popularity and use in relatively recent years, primarily in connection with birds which are near, or which have achieved, a mature age, and cage installations are quite common of mature birds kept for egg production or for final growth prior to processing for poultry meat products.

In more recent times, progress has been made in the design of poultry cages which will accommodate birds from the time they are tiny chicks until they reach a mature age. Considerable problems are involved in such a cage installation, since it is of course very desirable to utilize the same automated feeding equipment throughout the various growth stages of the birds, whereas the eating requirements of the birds at their various ages varies to a high degree. That is, when the birds are quite small the feed must be immediately accessible, so that the chicks can easily reach it, while at the same time the total quantity required is very much less than is true for more mature birds. The more mature birds require larger total quantities of feed, but it is desirable to provide such feed in a trough which is not completely filled by the required volume of feed, so that the birds cannot spill feed out of the trough when they eat. Further, the small birds require an access to the feeder trough at a relatively low level, whereas the more mature and taller birds require access at a higher level.

THE PRESENT INVENTION

In an earlier application of Willis R. Voran, Ser. No. 702,348, filed Feb. 1, 1968, which has a common assignee as the instant application a poultry cage having an adjustable floor and a feeder trough which could be modified in certain ways is provided, so that the cage will accommodate birds throughout a long period of their growth. The present invention is based on somewhat parallel concepts, and represents an extension of that previous invention, providing a number of additional benefits and desirable features.

In the present invention, a cage enclosure is provided in which the position of access openings in the front wall, through which the birds may feed from a feeder trough mounted adjacent the front wall, may be varied in accordance with the age and size of the birds. At the same time, the effective height or depth of the feeder trough may simultaneously be varied, by adjustment of the same member which varies the position of the access openings. Additionally, the level of the floor in the cages may be shifted upwardly or downwardly to suit the height of the growing birds, preferably through the provision of a novel support linkage mechanism.

Briefly stated, the present invention provides a cage enclosure with a front wall portion defining access openings through which the birds may feed, and a barrier means mounted for vertically adjustable movements with respect to the front wall, between at least first and second positions. In its first position, the barrier means covers upper portions of the access openings while uncovering lower portions thereof, to permit small birds to feed therethrough, while in its second position the barrier means covers lower portions of the access openings while uncovering upper portions thereof, thereby permitting larger birds to feed through the latter. The barrier means comprises in effect an upward extension of the sidewall of the feeder trough immediately adjacent the front wall of the cage, so that in its upper, or second position, the barrier interfits with such sidewall to effectively form an upwardly extended portion of such wall, thereby effectively deepening the trough and allowing greater quantities of feed to be maintained therein.

IN THE DRAWINGS

PREFERRED EMBODIMENT

Figure 1:
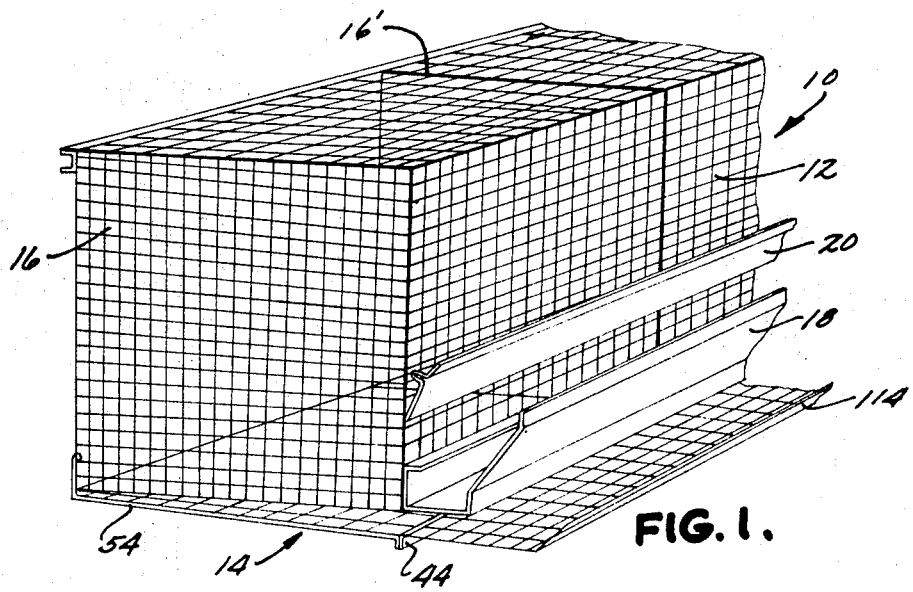
FIG. 1 is a fragmentary perspective view of the cage enclosure, showing its overall nature.

The overall nature of the caging enclosure 10 of the invention is best seen in FIG. 1, from which it may be seen that the enclosure is a rectangulated cage of wire mesh or the like, having a front wall 12, a floor portion 14, rear and top walls, end walls 16, and interior partitions 16'. As illustrated, the floor 14 extends outwardly beyond the front wall 12, and may be spaced somewhat beneath the lower extremity of the front wall. Mounted immediately adjacent the front wall is a feeder trough 18, and hingedly attached across the front wall is a barrier means 20.

Figure 3:
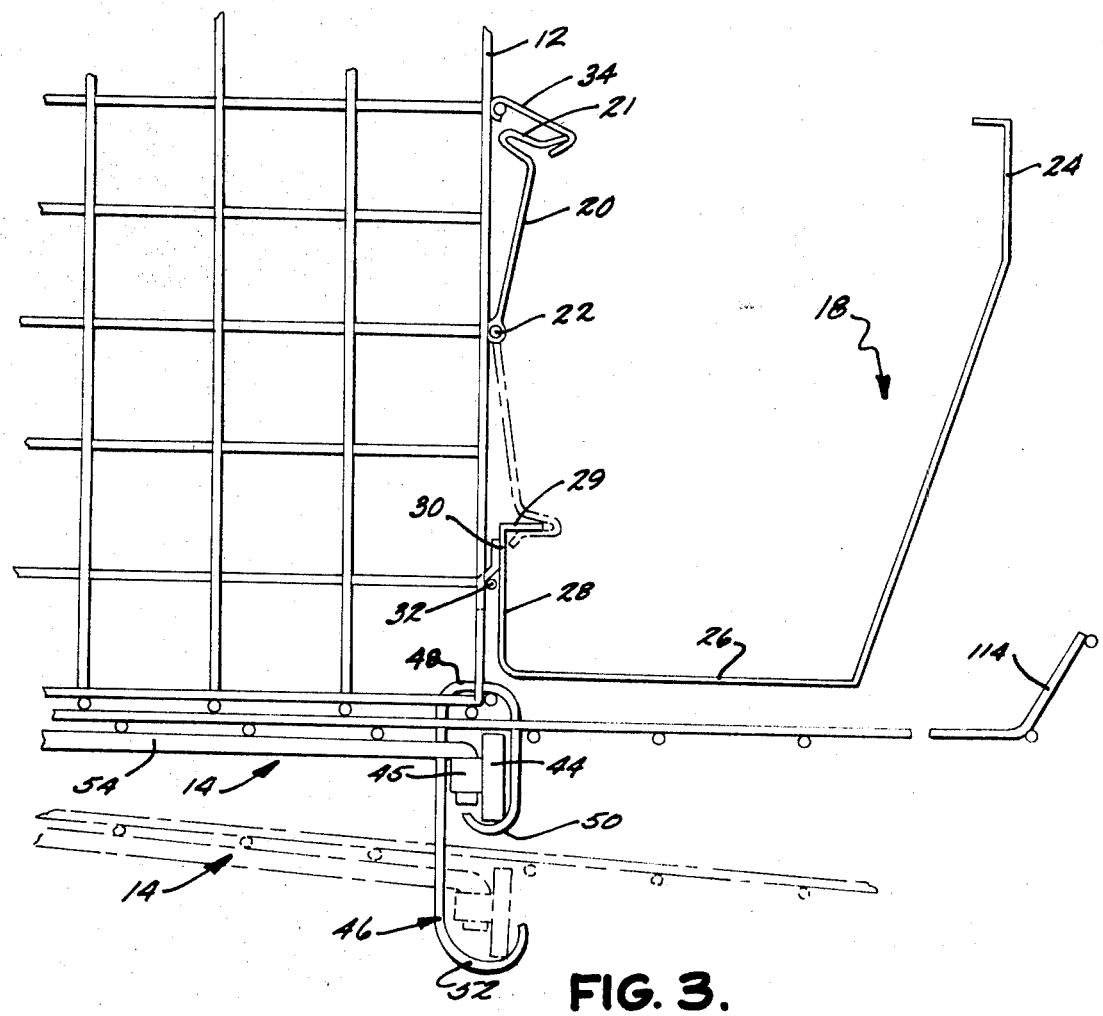
FIG. 3 is a further enlarged, fragmentary side elevation showing details at the front of the cage.

The arrangement of the feeder trough 18 and the barrier 20 are of paramount importance to the invention, and are best seen in FIGS. 1 and 3. Referring to these figures, it may be seen that the barrier means 20 comprises an elongated flaplike closure member, preferably somewhat hooklike in cross-sectional shape, mounted to the front wall 12 upon a horizontal pintle 22, which may comprise an integral part of the cage enclosure structure. The feeder trough 18 is somewhat J-shaped in cross section, having a low inner sidewall 28, and a high, elongated outer sidewall 24, which angles vertically upwardly and outwardly from a trough bottom 26 extending between the two sidewalls. The feeder trough may be attached to the cage enclosure 10 by its low inner wall 28, as by means of an offset bracket element 30 attached to the outer surface of the wall 28 and engageable over a horizontal stringer 32 or other like portion of the cage enclosure.

As illustrated, the uppermost extremity of the low trough wall 28 is laterally offset toward the interior of the trough to form an in-turned lip or flange 29 (FIG. 3). The end extremity of the barrier member 20 preferably has an angularly offset hook portion 21 which, when the barrier is swung about pintle 22 into its lower position, fits over the in-turned lip 29 of the trough, in a manner illustrated. Thus, in this position, the barrier 20 forms in effect an upward extension of trough sidewall 28, whereby the effective depth of the trough is very considerably increased. When the barrier is swung counterclockwise about the pintle 22, into its upper position, the hooked end portion 21 of the barrier is engaged by a hooklike latch element 34, which acts as a retainer for the barrier, holding it in its upward position. As indicated in FIG. 1, the cage enclosure 10 normally will comprise a plurality of laterally adjacent cage units separated only by upstanding end wall partitions 16', in which configuration the barrier member 20 and the feeder trough 18 are elongated elements extending along the length of the cage enclosure. Consequently, a number of individual latch elements 34 will be utilized, spaced along the front wall 12 of the enclosure.

Figure 4:
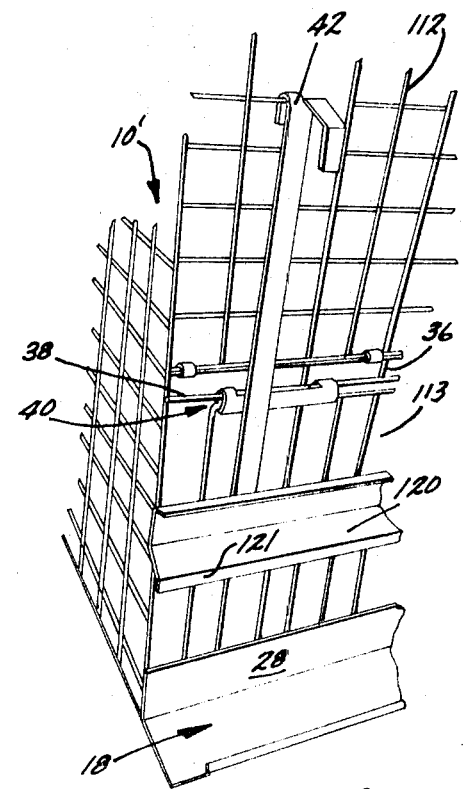
FIG. 4 is a fragmentary perspective view of a modification of the invention.

As stated previously, the cage enclosure 10 is preferably of wire mesh construction, and the front wall 12 should be arranged to have vertically elongated openings in it which will provide access openings through which the confined birds may feed from the trough 18. While these access openings may be provided in any specific desired structural manner and are present in conventional cage equipment, one desirable structural arrangement for this purpose is illustrated in FIG. 4, in which a cage enclosure 10' has a front wall 112 whose lower extremity 113 comprises a series of relatively widely spaced fixed vertical stringers or ribs 36 but few or no horizontal ribs to intersect the latter. In this arrangement, a horizontally disposed rib 38 located well above the feeder trough 18 supports a laterally slidable gate 40, made up of a plurality of vertical ribs similar to the fixed ribs 36 but laterally movable with respect thereto to vary the effective width of the access openings made available to the birds within the cage.

The aforementioned access openings in the front wall of the cage enclosure are thus directly affected by the position of the barrier member 20. That is, in the lower position of the barrier, the access openings are closed at their bottom extremity, and the birds have to feed over the top of the barrier member. In the upper position of the barrier, the situation is reversed and the lower extremities of the access openings may be partially, or even completely, obstructed, so that the birds can only feed through the upper extremities of these openings.

While a hinging configuration for the barrier member has already been described, an alternative arrangement is illustrated in FIG. 4, in which a very similar barrier member 120 is suspended for sliding vertical movement upon hangerlike supports 42, which include a hooking portion oriented toward the cage which can be engaged over horizontal parts of the mesh front wall 112, to maintain the barrier 120 at a desired point of vertical adjustment. In other respects, the barrier 120 is much the same as the barrier member 20 described previously, having an end extremity 121 adapted to fit over the top of the low inner trough wall 28 when the barrier is in its lowermost position.

Figure 2:
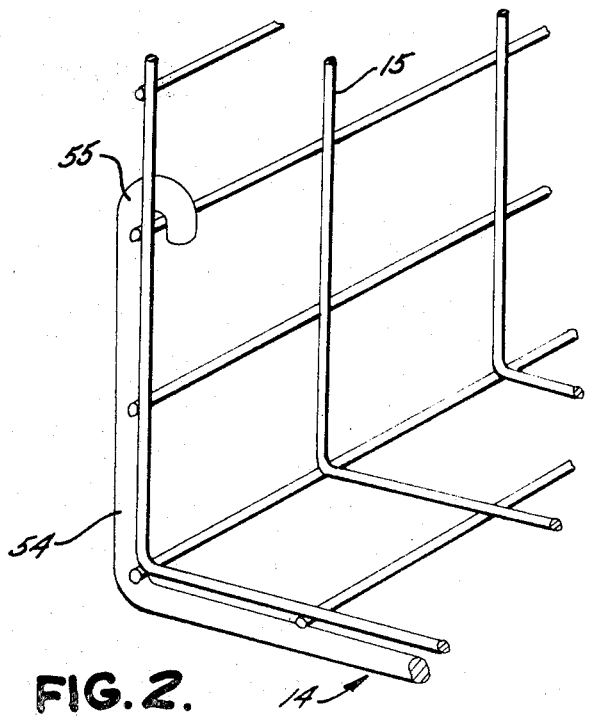
FIG. 2 is a greatly enlarged, fragmentary perspective view of the rear corner of the cage.

The floor 14 noted previously comprises an elongated mesh panel, normally of sufficient length to provide an integral floor over the entire length of the cage enclosure 10. The floor is mounted for vertical movement with respect to the remainder of the cage enclosure, particularly with respect to the front wall 12 thereof. This is preferably accomplished by a pivotal or hinging interconnection of the floor with the rear wall 15 (FIG. 2) of the cage enclosure, most preferably by making the floor and the rear wall 15 of integral construction, so that the floor when moved with respect to the cage enclosure merely springs slightly at its juncture with the rear wall 15. As illustrated in FIGS. 1 and 3, the floor 14 extends outwardly beyond the front wall 12 of the cage enclosure and has an upturned outer edge 114 enabling the projecting portion of the floor to function as an egg-receiving and collecting tray, in which a conveyor belt normally runs.

Disposed beneath and generally in the plane of the front wall 12, the floor 14 includes an elongated support bar 44, atop which rests the aforementioned mesh panel forming the floor portion of the cages. Support bar 44 is retained in place by a plurality of spaced suspension members 46 (FIG. 3), each having a looplike upper portion 48 which passes through the mesh openings of the front wall 12 and is vertically supported thereon. The suspension member 46 is an integral piece of wire or metal rod, whose two end extremities form a pair of hooklike projections 50 and 52 oriented toward one another but spaced on different levels, as illustrated. It is these projections which fit beneath the support bar 44 and hold the same at either of two possible positions of vertical adjustment, one at the level of the bottom of the front wall 12 and one spaced beneath the latter, as illustrated in FIG. 3. In order to strengthen the floor as an element of the cage enclosure, and to augment the structural integrity of the suspension of the floor from the remainder of the cage enclosure, a plurality of support elements 54 (FIGS. 1, 2 and 3) are provided. These elements are in the form of generally L-shaped rods having a hooking portion 55 at one end (FIG. 2) which engages over one of the horizontal ribs in the rear wall 15, and also having a right-angled projection at their opposite end (FIG. 3) which fits into and through a lanced out U-shaped deformation 45 of the support bar 44 disposed beneath front wall 12. The support elements 54 thus support the mesh floor panel between the front and rear walls of the cage enclosure in each of the two possible adjusted positions thereof, since the forward part of each element 54 moves vertically with support bar 44 whenever it is moved in the manner just described.

The linklike suspension members 46 just described are extremely useful in adjustment of the floor 14, since in order to drop the floor from the position shown in solid lines in FIG. 3 to the lower position shown in phantom, all that need be done is to pull the bottom of the link forwardly of the cage enclosure, by applying a moderately light force in the direction of the arrow. Such a force tends to slightly pivot the link with respect to the front wall of the cage, to the point where the upper hooklike projection 50 no longer supports the bar 44, at which point the bar is free to drop downwardly into the lower hook projection 52, where it automatically catches. When the support bar 44 drops downwardly, the weight of the mesh floor panel automatically causes it to accompany the support bar downwardly, such that a simple force applied to the support link 46 immediately drops the floor downwardly at the location of each of the spaced suspension links 46. As will be apparent, raising the floor is readily accomplished merely by manually lifting upwardly on the support bar 44 while holding the support links sufficiently forward to allow the support bar to pass upwardly between the upper hook 50 and the vertical portion of the link spaced adjacent thereto.

The usefulness and the purpose of the adjustably movable barrier member 20 in connection with the feed trough 18 has already been set forth and explained, at least to a large degree. Briefly, when chicks or relatively small birds are within the cages, the floor 14 is placed in its uppermost position, and the barrier 20 is raised to its upper position. The small birds then feed through the access openings revealed near the bottom of the front wall of the cage, with feed in the trough 18 being maintained at a relatively shallow depth, and in immediate accessibility to the birds. As the birds grow, the barrier 20 may be lowered, so that the depth of feed within the trough may be considerably increased, while at the same time allowing the birds in their taller structure to feed through the newly available, more elevated access openings. As the birds continue to grow, the floor may be dropped to its lower position, thereby accommodating the larger growth of the birds, and making the cage enclosure usable throughout their life span. As will be apparent to those skilled in the art, the present cage enclosure thus provides a truly versatile apparatus which by the most readily accomplished adjustments can easily accommodate poultry from a very young age through maturity, and even during the span of their egg production period.

It is entirely conceivable that upon examining the foregoing disclosure, those skilled in the art may device particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

I claim:

1. A confinement cage apparatus for poultry and the like comprising in combination: a caging enclosure having a front wall portion; a feed trough extending laterally along and mounted closely adjacent the outer side of said front wall portion, said trough having spaced inner and outer sidewalls with a bottom extending therebetween, said inner wall being adjacent said front wall portion and of less height than said outer wall; said front wall portion defining access openings therethrough permitting birds within said enclosure to feed from said feed trough outside the enclosure; and a barrier means mounted on and along said front wall portion for vertically adjustable movements toward and away from said feed trough between at least first and second positions; said barrier means having means engaging and interfitting with the inner wall of said trough within said trough, said barrier means when in said first position covering a laterally elongated strip of said access openings spaced above said trough while uncovering a laterally elongated strip of such openings disposed along the top 2. The apparatus of claim 1, wherein said barrier means comprises a closure member hingedly mounted for pivotal movement between said first and second positions.

3. The apparatus of claim 2, wherein said barrier means closure member is hinged upon front wall portion.

4. The apparatus of claim 1, wherein said caging enclosure comprises an elongated array including a plurality of individual cage units, and wherein said barrier means comprises an elongated member spanning several such units.

5. The apparatus of claim 1, further including retaining means for engaging said front wall portion and holding said barrier means in its said first position.

6. The apparatus of claim 5 wherein said retaining means comprises a latch element which engages said barrier means in its first position.

7. The apparatus of claim 1, wherein said enclosure includes a floor mounted for vertically adjustable movement with respect to said front wall portion and means for retaining said floor at different adjusted positions of such movement.

8. The apparatus of claim 7, wherein said enclosure includes a rear wall and said floor is mounted to said rear wall by a hinging interconnection and is pivotal with respect thereto for tilting movement.

9. The apparatus of claim 7, wherein said means for retaining said floor comprises a suspension member extending between said floor and said front wall portion.

10. The apparatus of claim 9, wherein said suspension member depends downwardly from said front wall and has at least two floor-engaging portions disposed at mutually different distances below said front wall.

11. The apparatus of claim 10, wherein said enclosure includes a rear wall and said floor is mounted to said rear wall by a hinging interconnection and is pivotal with respect thereto for tilting movement.

12. The apparatus of claim 11, wherein said floor includes a floor member and at least one support element attached to said rear wall and extending beneath said floor member, said support element having a portion engageable with said floor-engaging portions of said suspension member.

13. A confinement cage apparatus for poultry and the like comprising in combination: a caging enclosure having a front wall portion; said front wall portion defining access openings therethrough permitting birds within said enclosure to feed from a supply outside the enclosure; a feed trough mounted outside said enclosure and having an inner generally vertical sidewall disposed adjacent said front enclosure wall and an outer sidewall spaced therefrom; said outer sidewall comprising a fixed wall member having a predetermined height; and said inner trough sidewall comprising a pair of vertically separable parts one of which is adjustably mounted on said cage front wall portion, said separable parts when spaced apart forming a relatively shallow trough having a low sidewall immediately adjacent said front wall position and whose height is substantially less than that of said outer sidewall, said parts forming an opening between said separable parts through which opening the poultry can feed from said trough through said access openings, and said inner sidewall parts each having means engaging and interfitting with each other within said trough and thereby being joinable to form a sidewall substantially the same height as said outer wall member whereby a deeper trough having high sidewalls is formed.

14. A confinement cage apparatus for poultry and the like comprising in combination: a caging enclosure having a front wall portion and a floor; said floor mounted for vertically adjustable movement with respect to said front wall portion; and means for retaining said floor at different adjusted positions of such movement; said means comprising a suspension member depending downwardly from said front wall; said member having at least two floor-engaging portions disposed at mutually different distances below said front wall.

15. The apparatus of claim 14, wherein said floor-engaging portions are laterally extending projections.

16. The apparatus of claim 15, wherein said projections extend generally toward each other.

17. The apparatus of claim 16, wherein said projections are hooklike in nature.

18. The apparatus of claim 14, wherein said suspension member comprises a link of wirelike material and has a looped upper extremity.

19. The apparatus of claim 14, wherein said floor includes a floor member and at least one support element attached to said rear wall and extending beneath said floor member, said support element having a portion engageable with said floor-engaging portions of said suspension member.

20. The apparatus of claim 19, wherein said suspension member comprises a linklike element having a looped upper extremity, said floor-engaging portions comprising lateral projections disposed beneath said upper extremity.

PO-1050
(5/69)

UNITED STATES PATENT OFFICE
CERTIFICATE OF CORRECTION

Patent No. 3,593,689      Dated July 20, 1971

Inventor(s) Robert L. Van Huis

It is certified that error appears in the above-identified patent and that said Letters Patent are hereby corrected as shown below:

Col. 4, Claim 1, Line 70,
        after the word "top" please insert;

---of the trough, to permit small birds to feed therethrough; said barrier means when in said second position covering said laterally-elongated strip of said access openings along the top of said trough while uncovering said strip of openings spaced above the trough, to permit larger birds to feed therethrough; said barrier means having shaped portions whose configuration complements that of the inner side wall of said trough, and such portions interfitting with said inner wall in said second position to effectively deepen said trough; and means associated with said cage for locking said barrier means in either of the said first or second positions.---

Signed and sealed this 20th day of June 1972.

(SEAL)
Attest:

EDWARD M. FLETCHER, JR.          ROBERT GOTTSCHALK
Attesting Officer                 Commissioner of Patents